(12) United States Patent
Hoshino et al.

(10) Patent No.: US 10,775,163 B2
(45) Date of Patent: Sep. 15, 2020

(54) DIELECTRIC BOUNDARY SURFACE ESTIMATION DEVICE

(71) Applicant: Mitsubishi Electric Corporation, Tokyo (JP)

(72) Inventors: Takehiro Hoshino, Tokyo (JP); Teruyuki Hara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 22 days.

(21) Appl. No.: 16/318,081

(22) PCT Filed: Sep. 5, 2016

(86) PCT No.: PCT/JP2016/075981
§ 371 (c)(1),
(2) Date: Jan. 15, 2019

(87) PCT Pub. No.: WO2018/042655
PCT Pub. Date: Mar. 8, 2018

(65) Prior Publication Data
US 2020/0232791 A1 Jul. 23, 2020

(51) Int. Cl.
*G01B 15/08* (2006.01)
*G01B 15/00* (2006.01)

(52) U.S. Cl.
CPC .................................. *G01B 15/08* (2013.01)

(58) Field of Classification Search
CPC ............................... G01B 15/08; G01B 15/00
(Continued)

(56) References Cited

U.S. PATENT DOCUMENTS

2015/0005757 A1* 1/2015 Wang ................. A61B 18/1815
606/33
2016/0007859 A1* 1/2016 Arbabian ............. A61B 5/0093
600/407

FOREIGN PATENT DOCUMENTS

JP 11-271440 A 10/1999
JP 2004-198195 A 7/2004
(Continued)

OTHER PUBLICATIONS

Carin et al., "Physics-Based Classification of Rargets in Sar Imagry Using Subaperture Sequences," Department of Electrical and Computer Engineering, Duke University, Duram, NC, pp. 3341-3344.
(Continued)

*Primary Examiner* — Nicole M Ippolito
(74) *Attorney, Agent, or Firm* — Birch, Stewart, Kolasch & Birch, LLP (57) ABSTRACT

A dielectric boundary surface estimation device includes: a pre-processing unit pre-processing wave data obtained by observing a dielectric by a radar device; a three-dimensional synthetic aperture processing unit performing three-dimensional synthetic aperture processing on the wave data pre-processed by the pre-processing unit; and a dielectric boundary surface estimating unit estimating a boundary surface between areas having different dielectric constants to each other using the wave data on which the three-dimensional synthetic aperture processing is performed by the three-dimensional synthetic aperture processing unit. The dielectric boundary surface estimating unit calculates a width and a thickness of the boundary surface.

3 Claims, 6 Drawing Sheets

(58) Field of Classification Search
USPC .................................................. 250/251, 305
See application file for complete search history.

(56) References Cited

FOREIGN PATENT DOCUMENTS

| | | |
|---|---|---|
| JP | 2005-233783 A | 9/2005 |
| JP | 5629840 B1 | 11/2014 |
| JP | 2015-21823 A | 2/2015 |
| JP | 2015-197398 A | 11/2015 |

OTHER PUBLICATIONS

Extended European Search Report issued in corresponding European Application No. 16915210.5 dated Jun. 19, 2019.
Asami et al., "The Circuit Implementation by the Fixed Point Number in the Signal Processing of SAR," The Transactions of the Institute of Electronics, Information and Communication Engineers B, Aug. 1, 2014, vol. J97-B, No. 8, pp. 660-668.
International Search Report (PCT/ISA/210) issued in PCT/JP2016/075981, dated Nov. 29, 2016.
Ouchi, "Principles of Synthetic Aperture Radar for Remote Sensing," 2nd edition, Tokyo Denki University Press, Jun. 20, 2009, pp. 91-93, 193-195.
Communication pursuant to Article 94(3) EPC issued in correpsonding European Application No. 16 915 210.5 dated Jun. 30, 2020.

* cited by examiner

DIELECTRIC BOUNDARY SURFACE ESTIMATION DEVICE

TECHNICAL FIELD

The present invention relates to a dielectric boundary surface estimation device for estimating a boundary surface between dielectrics having different dielectric constants using a radio wave.

BACKGROUND ART

A dielectric boundary surface estimation device is used for measuring a state in a dielectric utilizing a property of passing through an inside of the dielectric which is a property of a radio wave as a wave, and contributes to cancer detection and diagnosis of material deterioration of a construction.

In the cavity thickness investigating method disclosed in following Patent Literature 1, scattering from a dielectric boundary point is observed with S transform processing. In this method, not a boundary surface but only a boundary point of a dielectric is measured. As for measurement of the shape of a dielectric, an ellipsoid is simply applied on a basis of visual observation irrespective of S transform and no special plan is devised.

CITATION LIST

Patent Literatures

Patent Literature 1: JP 2015-197398 A (FIG. 37)

SUMMARY OF INVENTION

Technical Problem

In the cavity thickness investigating method disclosed in Patent Literature 1 described above, there is a problem that only presence of a boundary point which is a part of a dielectric boundary surface can be grasped, and it is not possible to grasp the boundary surface. In addition, in Patent Literature 1 described above, as a method of estimating the shape of a dielectric, a method of applying an ellipsoid in an environment in which synthetic aperture processing is not applied is adopted, so that the width of a dielectric boundary surface in the horizontal direction cannot be accurately estimated.

The present invention has been made to solve the above-described problem and an object thereof is to accurately estimate a width and a thickness of a dielectric boundary surface.

Solution to Problem

A dielectric boundary surface estimation device according to the present invention includes: a pre-processing wave data obtained by observing a dielectric by a radar device; a three-dimensional synthetic aperture processor performing three-dimensional synthetic aperture processing on the wave data pre-processed by the pre-processor; and a dielectric boundary surface estimator estimating a boundary surface between areas having different dielectric constants to each other using the wave data on which the three-dimensional synthetic aperture processing is performed by the three-dimensional synthetic aperture processor and calculating a width and a thickness of the boundary surface. The dielectric boundary surface estimator performs division of the wave data on which the three-dimensional synthetic aperture processor performs the three-dimensional synthetic aperture processing in an azimuth direction and an elevation direction, performs three-dimensional inverse Fourier transform on the wave data after the division, extracts a trajectory of low-dielectric constant side boundary points corresponding to a low-dielectric constant side boundary surface and a trajectory of high-dielectric constant side boundary points corresponding to a high-dielectric constant side boundary surface out of the wave data after the division subjected to the three-dimensional inverse Fourier transform, calculates a width of the high-dielectric constant side boundary surface or a width of the low-dielectric constant side boundary surface from the trajectory of the high-dielectric constant side boundary points or the trajectory of the low-dielectric constant side boundary points, and calculates a thickness from the high-dielectric constant side boundary surface to the low-dielectric constant side boundary surface on a basis of a distance between a center of the trajectory of the high-dielectric constant side boundary points and a center of the trajectory of the low-dielectric constant side boundary points.

Advantageous Effects of Invention

According to the present invention, since a dielectric boundary surface is estimated using wave data subjected to three-dimensional synthetic aperture processing, it is possible to accurately estimate a width and a thickness of a dielectric boundary surface.

DESCRIPTION OF EMBODIMENTS

Hereinafter, in order to describe the present invention in more detail, some embodiments for carrying out the present invention will be described with reference to the accompanying drawings.

First Embodiment

Figure 1:
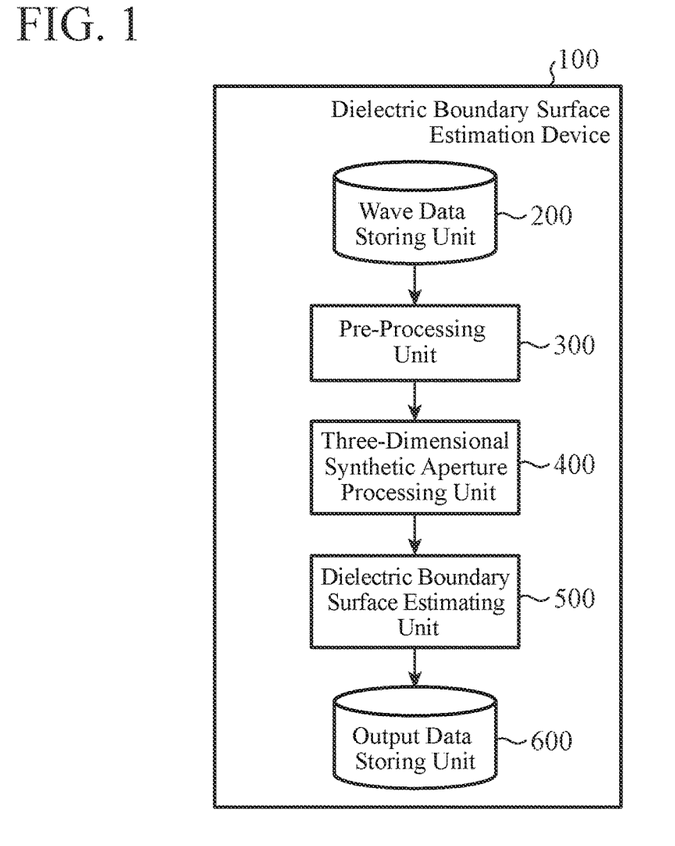
FIG. 1 is a functional configuration diagram illustrating a configuration example of a dielectric boundary surface estimation device according to a first embodiment of the present invention.

FIG. 1 is a functional configuration diagram illustrating a configuration example of a dielectric boundary surface estimation device 100 according to a first embodiment of the present invention. As illustrated in the drawing, the dielectric boundary surface estimation device 100 includes a wave data storing unit 200, a pre-processing unit 300, a three-dimensional synthetic aperture processing unit 400, a dielectric boundary surface estimating unit 500, and an output data storing unit 600.

Figure 2:
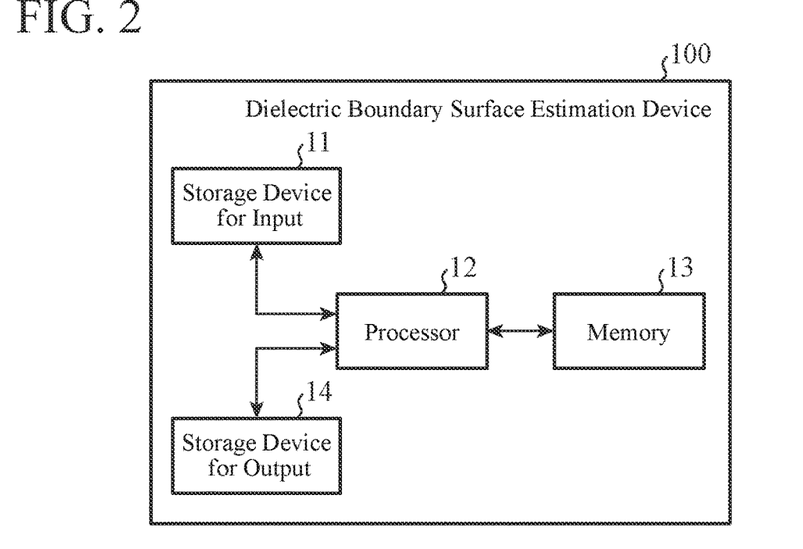
FIG. 2 is a hardware configuration diagram illustrating a configuration example of the dielectric boundary surface estimation device according to the first embodiment of the present invention.

FIG. 2 is a hardware configuration diagram illustrating a configuration example of the dielectric boundary surface estimation device 100 according to the first embodiment of the present invention. The wave data storing unit 200 in the dielectric boundary surface estimation device 100 is a storage device for input 11 and the output data storing unit 600 is a storage device for output 14. The storage device for input 11, the storage device for output 14, and a memory 13 to be described later may be a nonvolatile or volatile semiconductor device memory such as a random access memory (RAM), a read only memory (ROM), an erasable programmable ROM (EPROM), a flash memory, and a solid state drive (SSD), or a magnetic storage medium such as a hard disk and a flexible disk.

The functions of the pre-processing unit 300, the three-dimensional synthetic aperture processing unit 400, and the dielectric boundary surface estimating unit 500 in the dielectric boundary surface estimation device 100 are implemented by a processing circuit. That is, the dielectric boundary surface estimation device 100 is provided with the processing circuit for reading wave data stored in the storage device for input 11, pre-processing the wave data, performing three-dimensional synthetic aperture processing on the pre-processed wave data, estimating a boundary surface of the dielectric using the wave data subjected to the three-dimensional synthetic aperture processing, calculating a width and a thickness of the boundary surface, and storing the calculation result in the storage device for output 14. The processing circuit is a processor 12 which executes a program stored in the memory 13. The processor 12 is also referred to as a central processing unit (CPU), an arithmetic device, a microprocessor, a microcomputer or the like.

The functions of the pre-processing unit 300, the three-dimensional synthetic aperture processing unit 400, and the dielectric boundary surface estimating unit 500 are implemented by software, firmware, or a combination of software and firmware. The software or firmware is described as a program and stored in the memory 13. The processor 12 implements the functions of the respective units by reading and executing the program stored in the memory 13. That is, the dielectric boundary surface estimation device 100 includes the memory 13 for storing the program which is executed by the processor 12 to eventually execute steps illustrated in FIGS. 3 to 5 to be described later. It may also be said that the program allows a computer to execute a procedure or a method of each of the pre-processing unit 300, the three-dimensional synthetic aperture processing unit 400, and the dielectric boundary surface estimating unit 500.

Next, operation of the dielectric boundary surface estimation device 100 according to the first embodiment of the present invention will be described.

Figure 3:
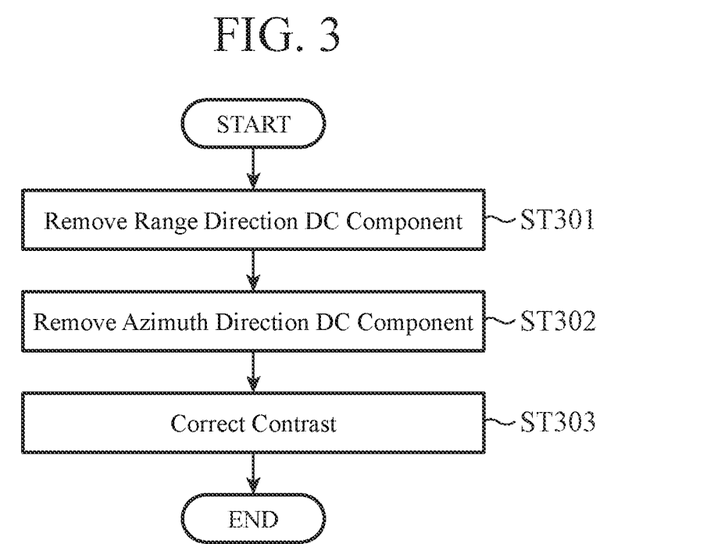
FIG. 3 is a flowchart illustrating processing performed by a pre-processing unit of the dielectric boundary surface estimation device according to the first embodiment of the present invention.
Figure 4:
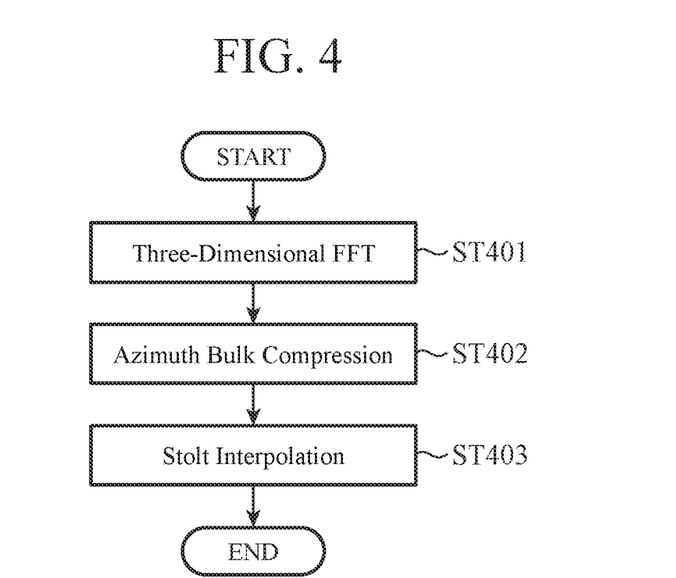
FIG. 4 is a flowchart illustrating processing performed by a three-dimensional synthetic aperture processing unit of the dielectric boundary surface estimation device according to the first embodiment of the present invention.
Figure 5:
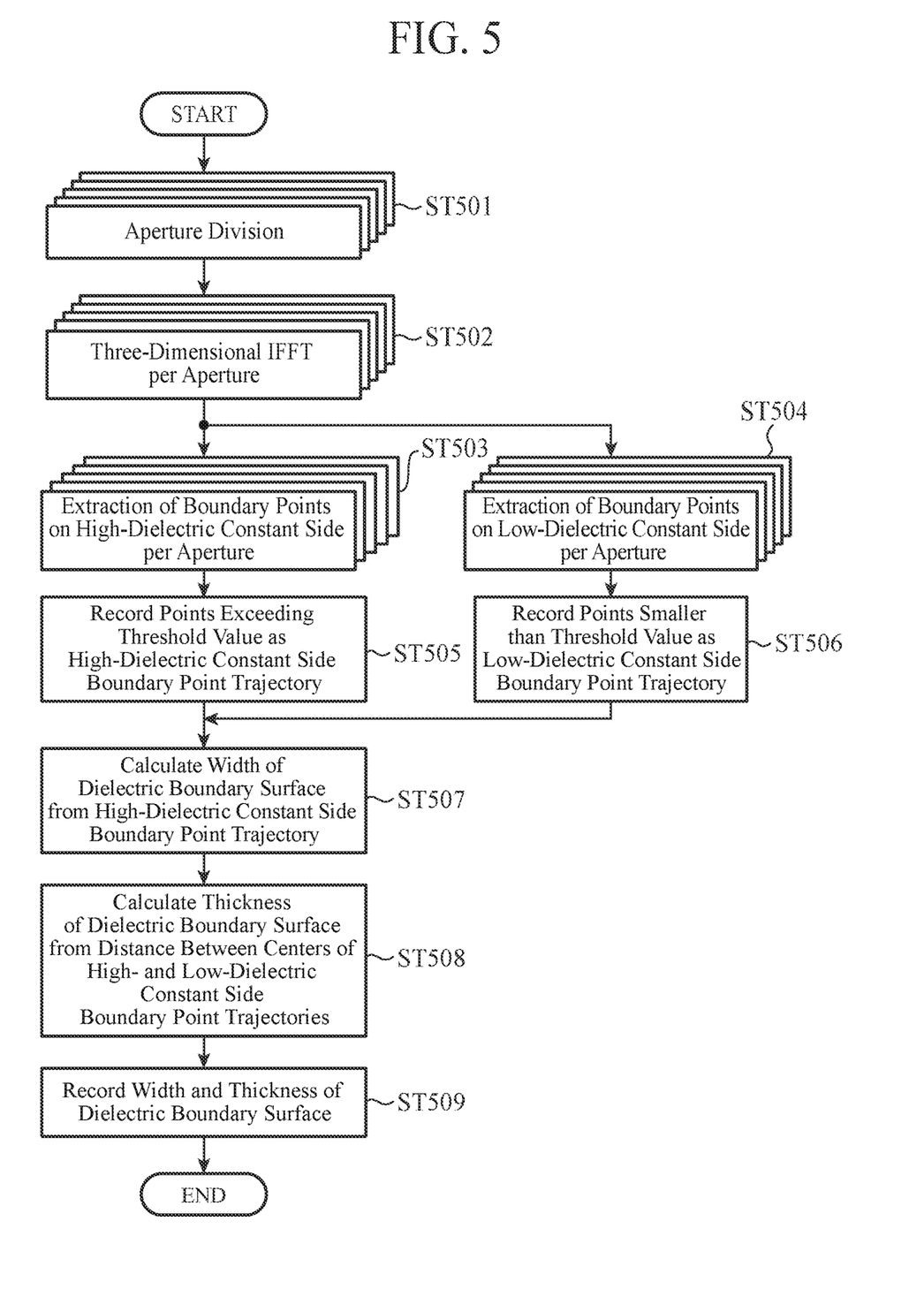
FIG. 5 is a flowchart illustrating processing performed by a dielectric boundary surface estimating unit of the dielectric boundary surface estimation device according to the first embodiment of the present invention.

FIG. 3 is a flowchart illustrating processing of the pre-processing unit 300. FIG. 4 is a flowchart illustrating processing of the three-dimensional synthetic aperture processing unit 400. FIG. 5 is a flowchart illustrating processing of the dielectric boundary surface estimating unit 500.

Figure 6:
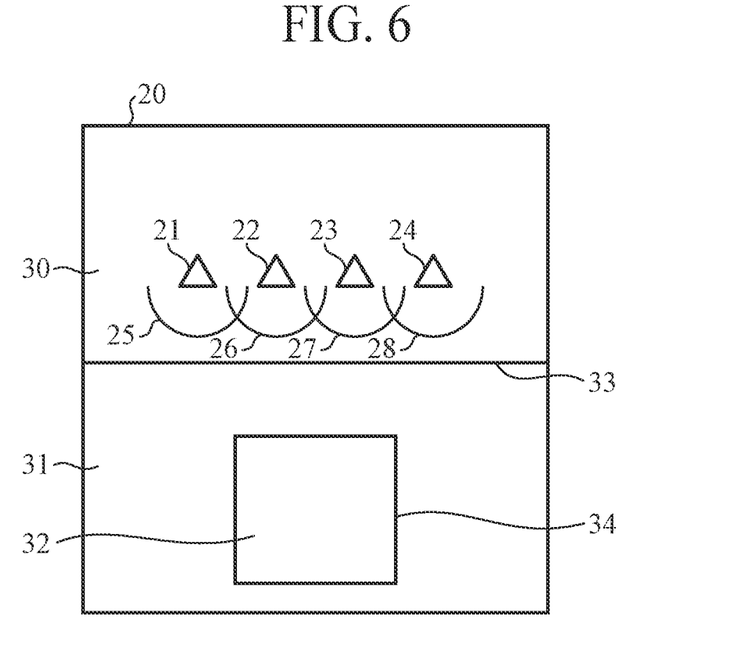
FIG. 6 is a view illustrating a situation when wave data stored in a wave data storing unit of the dielectric boundary surface estimation device according to the first embodiment of the present invention is observed.

FIG. 6 is a view illustrating a situation when wave data stored in the wave data storing unit 200 is obtained by observation. Hereinafter, an operation example of the dielectric boundary surface estimation device 100 is described using the wave data obtained by observation in the situation illustrated in FIG. 6.

In an observation system 20 in FIG. 6, the dielectric to be observed is a space 31 having a dielectric constant of $\varepsilon_{r,1}$. In the space 31, a space 32 having a relatively low dielectric constant of $\varepsilon_{r,2}$ ($\varepsilon_{r,2} < \varepsilon_{r,1}$) is included. Transceivers 21 to 24 of a radar device are arranged in a space 30 having a dielectric constant of $\varepsilon_{r,0}$ ($\varepsilon_{r,0} < \varepsilon_{r,1}$) lower than the dielectric constant $\varepsilon_{r,1}$ of the space 31.

The transceivers 21 to 24 transmit pulse-shaped radio waves 25 to 28 toward the space 31. The transmitted radio waves 25 to 28 are scattered on a dielectric boundary surface 33 which is a boundary between the spaces 30 and 31 having different dielectric constants and on a dielectric boundary surface 34 which is a boundary between the spaces 31 and 32 having different dielectric constants. The transceivers 21 to 24 receive the radio waves 25 to 28 scattered on the dielectric boundary surfaces 33 and 34. The radar device converts scattering information of the radio waves from the dielectric boundary surfaces 33 and 34 into three-dimensional voxel data on the basis of transmission/reception results of the radio waves 25 to 28 and outputs the voxel data to the dielectric boundary surface estimation device 100.

The above observation may be performed by a plurality of transceivers 21 to 24, or may be performed by moving one transceiver to the respective positions shown as the positions of the transceivers 21 to 24.

Hereinafter, scattering information obtained by observing an inside of the dielectric by the radar device is referred to as wave data s(x, y, t). Note that $x \in [-L_x/2, L_x/2]$ is defined as the azimuth direction, $y \in [-L_y/2, L_y/2]$ is defined as the elevation direction, and $t \in [0, T_{PRI}]$ is defined as the slant range direction. $L_x$ represents an aperture length in the azimuth direction, $L_y$ represents an aperture length in the elevation direction, and $T_{PRI}$ represents a pulse repetition cycle.

The wave data storing unit 200 receives and stores wave data obtained by observing the inside of the dielectric by the radar device. The wave data stored in the wave data storing unit 200 is transferred to the pre-processing unit 300.

The pre-processing unit 300 performs the pre-processing at steps ST301 to ST303 to be described below in detail on the wave data transferred from the wave data storing unit 200 and outputs the processed wave data to the three-dimensional synthetic aperture processing unit 400.

At step ST301, the pre-processing unit 300 removes the DC component in the range direction from the wave data. Specifically, the pre-processing unit 300 estimates a range direction DC component $s_{0,t}(x, y, t)$ in, consideration of a case where the wave data $s(x, y, t)$ transferred from the wave data storing unit 200 is fixed decimal data and the like in accordance with equation (1). Subsequently, the pre-processing unit 300 obtains wave data $s_{DC,t}(x, y, t)$ from which the range direction DC component is removed by removing the range direction DC component $s_{0,t}(x, y, t)$ from the wave data $s(x, y, t)$ using equation (2).

$$s_{0,t}(x, y, t) = \frac{1}{T_{PRI}} \int_0^{T_{PRI}} s(x, y, t) dt \qquad (1)$$

$$s_{DC,t}(x, y, t) = s(x, y, t) - s_{0,t}(x, y, t) \qquad (2)$$

At step ST302, the pre-processing unit 300 removes the DC component in the azimuth direction from the wave data. Specifically, the pre-processing unit 300 estimates the azimuth direction DC component $s_{0,t,x}(x, y, t)$ in consideration of a case where the wave data $s(x, y, t)$ transferred from the wave data storing unit 200 is fixed decimal data and the like in accordance with equation (3). Subsequently, the pre-processing unit 300 obtains wave data $s_{DC,t,x}(x, y, t)$ from which the DC components in the azimuth direction and the range direction are removed by removing the azimuth direction DC component $s_{0,t,x}(x, y, t)$ from the wave data $s_{DC,t}(x, y, t)$ from which the range direction DC component is removed using equation (4).

$$s_{0,t,x}(x, y, t) = \frac{1}{L_x} \int_{-L_x/2}^{L_x/2} s(x, y, t) dx \qquad (3)$$

$$s_{DC,t,x}(x, y, t) = s_{DC,t}(x, y, t) - s_{0,t,x}(x, y, t) \qquad (4)$$

At step ST303, the pre-processing unit 300 corrects attenuation of the wave when the radio wave passes through the inside of the dielectric by performing contrast correction on the wave data. Specifically, the pre-processing unit 300 defines a contrast correction function $s_{CNT,x}(x, y, t)$ in consideration of the attenuation, of the wave as shown in equation (5) for the wave data $s_{DC,t,x}(x, y, t)$ in which the DC, components in the azimuth direction and the range direction are removed. Subsequently, the pre-processing unit 300 performs the contrast correction on the wave data $s_{DC,t,x}(x, y, t)$ using equation (6) and obtains wave data $s_{PRE}(x, y, t)$ after the contrast correction. The pre-processing unit 300 outputs the pre-processed wave data $s_{PRE}(x, y, t)$ to the three-dimensional synthetic aperture processing unit 400.

$$s_{CNT,t,x}(x, y, t) = \sqrt{\frac{1}{T_{PRI}} |s(x, y, t)|^2 dt} \qquad (5)$$

$$s_{PRE}(x, y, t) = \frac{s_{DC,t,x}(x, y, t)}{s_{CNT,t,x}(x, y, t)} \qquad (6)$$

The three-dimensional synthetic aperture processing unit 400 performs three-dimensional synthetic aperture processing at steps ST401 to ST403 to be described in detail below on the pre-processed wave data output, by the pre-processing unit 300 and outputs the wave data after the processing to the dielectric boundary surface estimating unit 500.

At step ST401, the three-dimensional synthetic aperture processing unit 400 performs three-dimensional Fourier transform for converting the pre-processed wave data into wave data in a frequency space. Specifically, the three-dimensional synthetic aperture processing, unit 400 performs three-dimensional fast Fourier transform (FFT) on the pre-processed wave data $s_{PRE}(x, y, t)$ received from the pre-processing unit 300 using equation (7) and converts the pre-processed wave data $s_{PRE}(x, y, t)$ into wave data $s_{PRE}(k_x, k_y, k)$ in the frequency space.

$$S_{PRE}(k_x, k_y, k) = \qquad (7)$$
$$\iiint s_{PRE}(x, y, t) \exp\left[-j\left(k_x x + k_y y + k \frac{t}{\sqrt{\epsilon_{r,1}} c}\right)\right] dx dy dt$$

At step ST402, the three-dimensional synthetic aperture processing unit 400 performs azimuth bulk compression to compensate a wave surface of the wave data to a spherical shape in the frequency space. Specifically, the three-dimensional synthetic aperture processing unit 400 obtains wave data $S_{BULK}(k_x, k_y, k)$ in which the wave surface of the wave data $S_{PRE}(k_x, k_y, k)$ is made uniform and the image of the wave data is focused by performs the azimuth bulk compression by calculating equation (8) on the wave data $S_{PRE}(k_x, k_y, k)$ after the three-dimensional FFT and.

$$S_{BULK}(k_x, k_y, k) = S_{PRE}(k_x, k_y, k) \cdot \exp(jR_0 k_z) \qquad (8)$$

Note that, in equation (8), $R_0$ represents a focus distance, and is defined by, for example, equation (9-1). $k_z$ represents a wave number defined by equation (9-2).

$$R_0 = \sqrt{\epsilon_{r,1}} \, cT_{PRI}/2 \qquad (9\text{-}1)$$

$$k_z = \sqrt{4k^2 - k_x^2 - k_y^2} \qquad (9\text{-}2)$$

$$2k = \sqrt{k_x^2 + k_y^2 + k_z^2} \qquad (9\text{-}3)$$

At step ST403, the three-dimensional synthetic aperture processing unit 400 performs Stolt interpolation to orthogonalize a wave transmitting direction 2k of the wave data in the x axis and the y axis. The direction of a wave number vector means the wave surface and the wave transmitting direction, and the wave number vector 2k generally observed by the radar device can be orthogonally decomposed into the wave number vectors ($k_x$, $k_y$, $k_z$), for example. This means that equation (9-3) described above holds from the Pythagorean theorem. Although the wave number vectors $k_x$ and $k_y$ can be immediately defined to be orthogonal to each other on an antenna surface, $k_z$ in equation (9-2) described above cannot be observed directly and can be observed only as a function of ($k_x$, $k_y$, 2k). Processing of interpolation using equation (9-2) described above from ($k_x$, $k_y$, 2k) to ($k_x$, $k_y$, $k_z$) to make a state in which the observable and definable wave numbers ($k_x$, $k_y$, 2k) are orthogonal is the Stolt interpolation processing. Specifically, the three-dimensional synthetic aperture processing unit 400 obtains wave data $S_{SAR}(k_x, k_y, k_z)$ after the three-dimensional synthetic aperture processing by performing the Stolt interpolation to convert the wave number space $(k_x, k_y, k)$ to $(k_x, k_y, k_z)$ for the wave data $S_{BULK}(k_x, k_y, k)$ after the azimuth bulk compression. The three-dimensional synthetic aperture processing unit 400 outputs the wave data $S_{SAR}(k_x, k_y, k_z)$ after the three-dimensional synthetic aperture processing to the dielectric boundary surface estimating unit 500.

Figure 7:
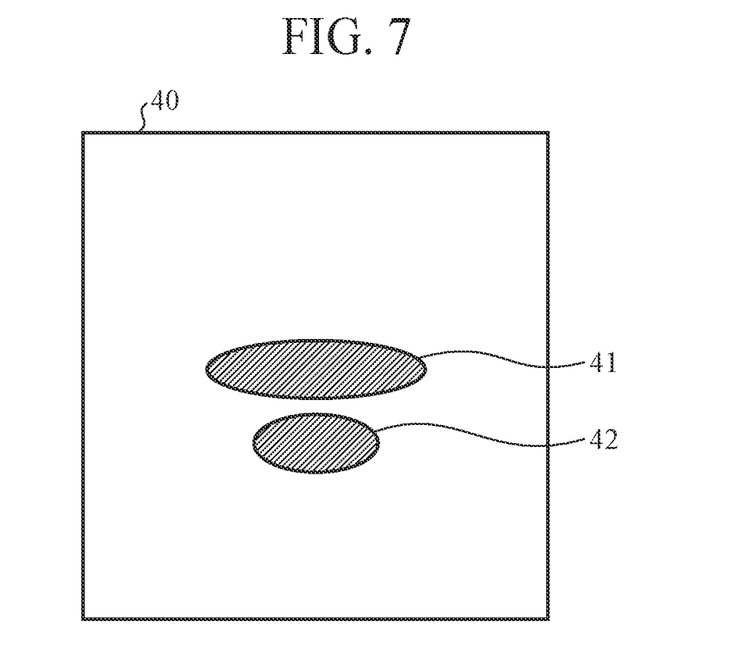
FIG. 7 is a view illustrating the wave data after the three-dimensional synthetic aperture processing unit of the dielectric boundary surface estimation device according to the first embodiment of the present invention performed three-dimensional synthetic aperture processing.

FIG. 7 is a view illustrating wave data 40 after the three-dimensional synthetic aperture processing is performed by the three-dimensional synthetic aperture processing unit 400, that is, the wave data $S_{SAR}(k_x, k_y, k_z)$. The high-dielectric constant side boundary 41 in the wave data 40 after the three-dimensional synthetic aperture processing corresponds to the dielectric boundary surface 33 in the observation system 20 illustrated in FIG. 6. The low-dielectric constant side boundary 42 in the wave data 40 after the three-dimensional synthetic aperture processing corresponds to the dielectric boundary surface 34 in the observation system 20 illustrated in FIG. 6.

Note that the three-dimensional synthetic aperture processing performed by the three-dimensional synthetic aperture processing unit 400 is a technology well-known as the Omega-K system.

In addition, as an interpolation method performed at step 403, other than the Stolt interpolation described above as an example, sinc interpolation or cubic interpolation may be used, for example.

The dielectric boundary surface estimating unit 500 calculates the width and the thickness of the dielectric boundary surface by performing dielectric boundary surface estimation processing at steps ST501 to ST509 to be described below in detail on the wave data after the three-dimensional synthetic aperture processing output by the three-dimensional synthetic aperture processing unit 400, and outputs the calculation result to the output data storing unit 600.

At step ST501, the dielectric boundary surface estimating unit 500 decomposes the dielectric boundary surface into a dielectric boundary point group by dividing the wave data after the three-dimensional synthetic aperture processing into a plurality of observation units from respective phase centers. Hereinafter, a process at step ST501 is referred to as aperture division. Specifically, the dielectric boundary surface estimating unit 500 obtains wave data per aperture $S_{SAR,n,m}(k_x, k_y, k_z)$ after aperture division by dividing the wave data $S_{SAR}(k_x, k_y, k_z)$ after the three-dimensional synthetic aperture processing received from the three-dimensional synthetic aperture processing unit 400 by N in the azimuth direction and by M in the elevation direction using equation (10).

$$S_{SAR,n,m}(k_x, k_y, k_z) = \qquad (10)$$
$$S_{SAR}(k_x - n\Delta k_x, k_y - m\Delta k_y, k_z) \cdot rect\left(\frac{K_{Bcut,x}}{k_x}\right) \cdot rect\left(\frac{K_{Bcut,y}}{k_y}\right)$$

Note that, in equation (10), $K_{Bcut,x}$ represents an effective bandwidth in the azimuth direction after the aperture division, and $K_{Bcut,y}$ represents an effective bandwidth in the elevation direction after the aperture division. Further, $n \in [0, N-1]$ and $m \in [0, M-1]$. $\Delta k_x$ represents a pitch width of the aperture division in the azimuth direction and $\Delta k_y$ represents a pitch width of the aperture division in the elevation direction.

When the bandwidths after the aperture division are represented by $K_{B,x}$ and $K_{B,y}$, the relationship in equation (11) is satisfied among $K_{B,x}$, $K_{B,y}$, $K_{Bcut,x}$, and $K_{Bcut,y}$.

$$K_{B,x} = K_{Bcut,x} + (N-1)\Delta k_x,$$

$$K_{B,y} = K_{Bcut,y} + (M-1)\Delta k_y \qquad (11)$$

At step ST502, the dielectric boundary surface estimating unit 500 performs three-dimensional inverse Fourier transform which converts the wave data per aperture obtained by the aperture division from a frequency domain to a spatial domain. Specifically, the dielectric boundary surface estimating unit 500 performs three-dimensional inverse, fast Fourier transform (IFFT) on the wave data per aperture $S_{SAR,n,m}(k_x, k_y, k_z)$ using equation (12) and converts it into wave data per aperture $I_{SAR,n,m}(x, y, z)$ of the spatial domain.

$$I_{SAR,n,m}(x, y, z) = \qquad (12)$$
$$\frac{1}{(2\pi)^3} \int \int \int S_{SAR,n,m}(k_x, k_y, k_z) \exp[j(k_x x + k_y y + k_z z)] dk_x dk_y dk_z$$

Figure 8:
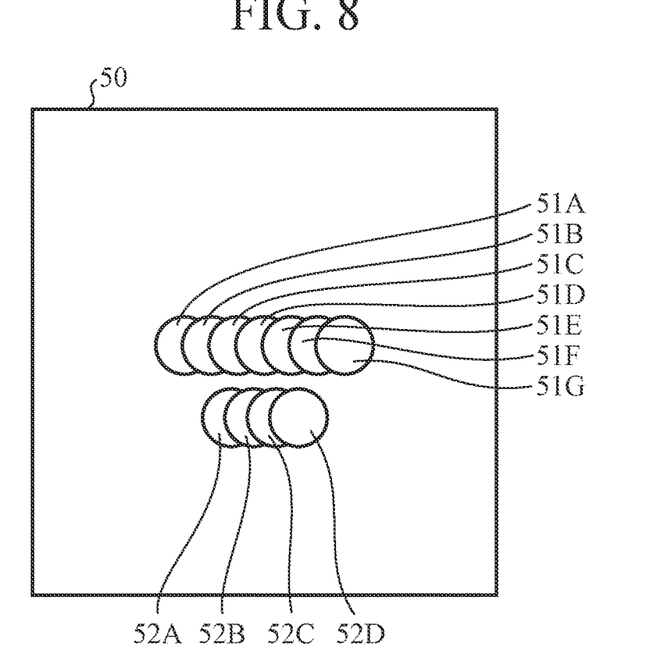
FIG. 8 is a view illustrating the wave data after the dielectric boundary surface estimating unit of the dielectric boundary surface estimation device according to the first embodiment of the present invention performed aperture division and three-dimensional inverse fast Fourier transform.

FIG. 8 is a view illustrating wave data 50 after the dielectric boundary surface estimating unit 500 performs the aperture division and the three-dimensional IFFF. By the processes at steps ST501 and ST502, a portion of the high-dielectric constant side boundary 41 in the wave data 40 after the three-dimensional synthetic aperture processing illustrated in FIG. 7 is divided into a plurality of local small areas as shown in wave data per aperture 51A to 51G illustrated in FIG. 8. The wave, data per aperture 51A to 51G can be referred to as the dielectric boundary point group obtained by decomposing the dielectric boundary surface 33. Similarly, a portion of the low-dielectric constant side boundary 42 in the wave data 40 after the three-dimensional synthetic aperture processing illustrated in FIG. 7 is divided into, a plurality of local small areas as shown in wave data per aperture 52A to 52D illustrated in FIG. 8. The wave data per aperture 52A to 52D can be referred to as the dielectric boundary point group obtained by decomposing the dielectric boundary surface 34.

Note that, although not illustrated in FIG. 8 a portion other than the wave data Per aperture 51A to 51G and 52A to 52D in the wave data 50 is also divided into a plurality of local small areas as is the case with the wave data per aperture 51A to 51G and 52A to 52D.

At step ST503, the dielectric boundary surface estimating unit 500 extracts high-dielectric constant side boundary points exceeding a predetermined threshold from the wave data per aperture. At subsequent step ST505, the dielectric boundary surface estimating unit 500 records the extracted high-dielectric constant side boundary point group as a high-dielectric constant side boundary point trajectory.

Specifically, the dielectric boundary surface estimating unit 500 obtains a set of local maximum points of the wave data per aperture exceeding a threshold T, that is, a high-dielectric constant side boundary point trajectory $(x_{top,n,m}, y_{top,n,m}, z_{top,n,m})$ by calculating equation (13) for high-dielectric constant side boundary surface candidates $\{x_+, y_+ | Re[I_{SAR,n,m}(x, y, z)] \geq T\}$ exceeding the threshold T out of the wave data per aperture.

Note that, in next equation (13) and equation (14) to be described below, T represents a predetermined threshold, which is a value corresponding to signal power of the radio wave scattered on the dielectric boundary surface 33 on the high-dielectric constant side.

$$(x_{top,n,m}, y_{top,n,m}, z_{top,n,m}) = \arg\max_{x_+, y_+, z} \text{Re}[I_{SAR,n,m}(x_+, y_+, z)] \quad (13)$$

At step ST504, the dielectric boundary surface estimating unit 500 extracts low-dielectric constant side boundary points smaller than the predetermined threshold from the wave data per aperture. At subsequent step ST506, the dielectric boundary surface estimating unit 500 records the extracted low-dielectric constant side boundary point group as a low-dielectric constant side boundary point trajectory.

Specifically, the dielectric boundary surface estimating unit 500 obtains a set of local minimum points of the wave data per aperture smaller than the threshold T, that is, a low-dielectric constant side boundary point trajectory $(X_{btm,n,m}, Y_{btm,n,m}, Z_{btm,n,m})$ by calculating equation (14) for low-dielectric constant side boundary surface candidates $\{x_-, y_-|\text{Re}[I_{SAR,n,m}(x, y, z)] < T\}$ smaller than the threshold T out of the wave data per aperture.

$$(x_{btm,n,m}, y_{btm,n,m}, z_{btm,n,m}) = \arg\min_{x_-, y_-, z} \text{Re}[I_{SAR,n,m}(x_-, y_-, z)] \quad (14)$$

Figure 9:
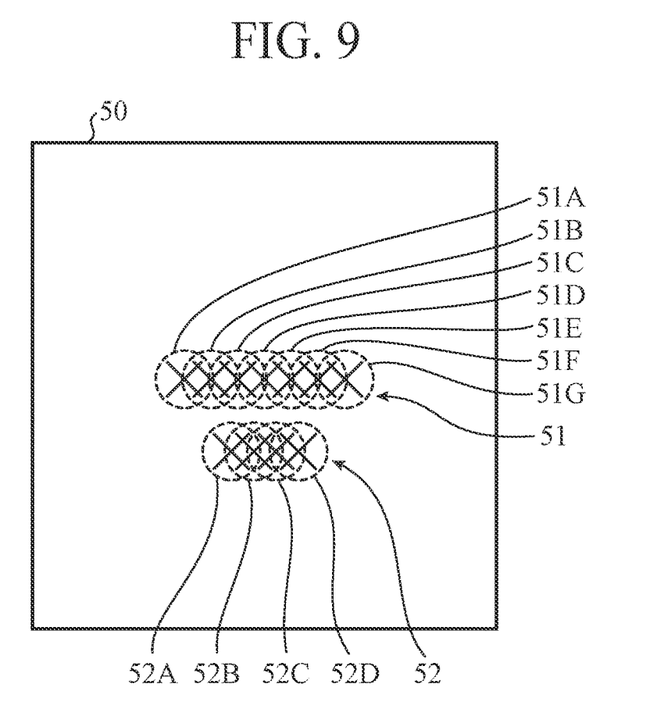
FIG. 9 is a view illustrating a high-dielectric constant side boundary point trajectory and low-dielectric constant side boundary point trajectory calculated by the dielectric boundary surface estimating unit of the dielectric boundary surface estimation device according to the first embodiment of the present invention.

FIG. 9 is a view illustrating a high-dielectric constant side boundary point trajectory 51 and a low-dielectric constant side boundary point trajectory 52 calculated by the dielectric boundary surface estimating unit 500. The high-dielectric constant side boundary point trajectory 51 is a set of local maximum points of the wave data per aperture 51A to 51G on the high-dielectric constant side exceeding the threshold. The low-dielectric constant side boundary point trajectory 52 is a set of local minimum points of the wave data per aperture 52A to 52D on the low-dielectric constant side smaller than the threshold.

Note that, in FIG. 9, the local maximum points of the wave data per aperture 51A to 51G and the local minimum points of the wave data per aperture 52A to 52D are indicated by the intersection of each of "x" marks.

At step ST507, the dielectric boundary surface estimating unit 500 calculates the width of the dielectric boundary surface using the obtained high-dielectric constant side boundary point trajectory 51. Specifically, the dielectric boundary surface estimating unit 500 calculates the widths ($\Delta x$, $\Delta y$) of the dielectric boundary surface from the high-dielectric constant side boundary point trajectory 51 using equations (15) and (16).

$$\Delta x = \max_m \left[ \max_n x_{top,n,m} - \min_n x_{top,n,m} \right] \quad (15)$$

$$\Delta y = \max_m \left[ \max_n y_{top,n,m} - \min_n y_{top,n,m} \right] \quad (16)$$

At step ST508, the dielectric boundary surface estimating unit 500 calculates a thickness of a space between the dielectric boundary surfaces using the obtained high-dielectric constant side boundary point trajectory 51 and low-dielectric constant side boundary trajectory 52. Specifically, the dielectric boundary surface estimating unit 500 calculates the distance from the center of the high-dielectric constant side boundary point trajectory 51 to the center of the low-dielectric constant side boundary point trajectory 52 using equation (17) as a thickness $\Delta z$ between the dielectric boundary surfaces.

$$\Delta z = \{z_{btm,n,m} - z_{top,n,m}\} \quad (17)$$

wherein $n = \dfrac{N}{2}, m = \dfrac{M}{2}$

Figure 10:
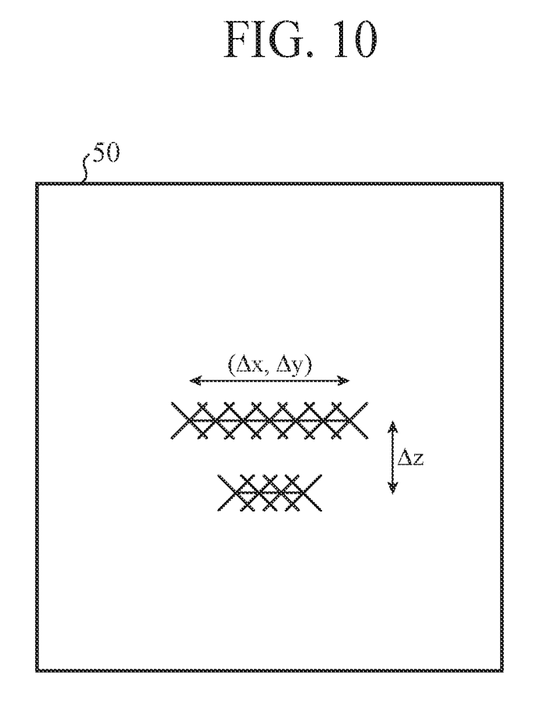
FIG. 10 is a view illustrating widths and a thickness of a dielectric boundary surface calculated by the dielectric boundary surface estimating unit of the dielectric boundary surface estimation device according to the first embodiment of the present invention.

FIG. 10 is a view illustrating the widths ($\Delta x$, $\Delta y$) and the thickness $\Delta z$ of the dielectric boundary surface calculated by the dielectric boundary surface estimating unit 500. The widths ($\Delta x$, $\Delta y$) of the dielectric boundary surface indicated by an arrow in FIG. 10 correspond to widths of the dielectric boundary surface 34 being the boundary between the space 31 which is the dielectric to be observed and the space 32 included in the space 31 in FIG. 6. The thickness $\Delta z$ between the dielectric boundary surfaces indicated by an arrow in FIG. 10 corresponds to a thickness of the space 31 from the dielectric boundary surface 33 to the dielectric boundary surface 34 in FIG. 6.

At step ST509, the dielectric boundary surface estimating unit 500 records a calculation result of the widths and the thickness of the dielectric boundary surface. In addition, the dielectric boundary surface estimating unit 500 transfers the recorded calculation result to the output data storing unit 600.

The output data storing unit 600 receives the calculation result of the widths and the thickness of the dielectric boundary surface transferred from the dielectric boundary surface estimating unit 500 and the wave data after the three-dimensional synthetic aperture processing and stores them. The output data storing unit 600 can output the stored calculation result and wave data to the outside.

The output data storing unit 600 may receive the wave data $S_{SAR}(k_x, k_y, k_z)$ after the three-dimensional synthetic aperture processing directly from the three-dimensional synthetic aperture processing unit 400 or via the dielectric boundary surface estimating unit 500.

As is apparent from above, according to the first embodiment, a dielectric boundary surface estimation device 100 includes: a pre-processing unit 300 pre-processing wave data obtained by observing a dielectric by a radar device; a three-dimensional synthetic aperture processing unit 400 performing three-dimensional synthetic aperture processing on the wave data pre-processed by the pre-processing unit 300; and a dielectric boundary surface estimating unit 500 estimating a boundary surface between areas having different dielectric constants to each other using the wave data on which the three-dimensional synthetic aperture processing is performed by the three-dimensional synthetic aperture processing unit 400 and calculating a width and a thickness of the boundary surface. Since the position of the dielectric boundary surface is estimated using the wave data subjected to the three-dimensional synthetic aperture processing, it is possible to estimate the widths and the thickness of the dielectric boundary surface with high accuracy.

Further, according to the first embodiment, the dielectric boundary surface estimating unit 500 performs division of the wave data on which the three-dimensional synthetic aperture processing unit 400 performs the three-dimensional synthetic aperture processing in an azimuth direction and an elevation direction, performs three-dimensional inverse Fourier transform on the wave data after the division, extracts a low-dielectric constant side boundary point trajectory 52 corresponding to a dielectric boundary surface 34 on the low-dielectric constant side and a high-dielectric constant side boundary point trajectory 51 corresponding to a dielectric boundary surface 33 on the high-dielectric constant side out of the wave data after the division subjected to the three-dimensional inverse Fourier transform, calculates a width of the dielectric boundary surface 34 on the low-dielectric constant side from the high-dielectric constant side boundary point trajectory 51, and calculates a thickness from the dielectric boundary surface 33 on the high-dielectric constant side to the dielectric boundary surface 34 on the low-dielectric constant side on a basis of a distance between a center of the high-dielectric constant side boundary point trajectory 51 and a center of the low-dielectric constant side boundary point trajectory 52. By dividing the dielectric boundary surface into trajectories of points on the basis of the aperture division processing, position estimation accuracy of the dielectric boundary surface can be further improved.

Note that, although the space 31 including the space 32 of the lower-dielectric constant inside is the observation target in the first embodiment, the dielectric boundary surface estimation device 100 may also be used when the dielectric constant of the space 32 is higher than the dielectric constant of the space 31.

Even when the dielectric constant of the space 32 is higher than the dielectric constant of the space 31, that is, when $\varepsilon_{r,0} < \varepsilon_{r,1} < \varepsilon_{r,2}$ is satisfied, the dielectric boundary surface estimation device 100 can calculate the widths and the thickness of the dielectric boundary surface by performing the processing illustrated in FIGS. 3 to 5. In this calculation, in the description at steps ST503 to ST508, "high-dielectric constant side" is replaced with "low-dielectric constant side", "low-dielectric constant side" is replaced with "high-dielectric constant side", "local maximum point" is replaced with "local minimum point", and "local minimum point" is replaced with "local maximum point".

Thus, when the dielectric constant of the space 32 is higher than the dielectric constant of the space 31, the dielectric boundary surface 33 in FIG. 6 is on the low-dielectric constant side and the dielectric boundary surface 34 is on the high-dielectric constant side. When calculating the widths of the dielectric boundary surface 34 which is the boundary between the space 31 and the space 32, the dielectric boundary surface estimating unit 500 uses the set of the local minimum points of the wave data per aperture which are smaller than the threshold, that is, the low-dielectric constant side boundary point trajectory.

According to the first embodiment, the three-dimensional synthetic aperture processing unit 400 performs three-dimensional Fourier transform on the wave data pre-processed by the pre-processing unit 300, performs azimuth bulk compression to make a wave surface uniform on the wave data subjected to the three-dimensional Fourier transform, and thereafter performs interpolation to orthogonalize a wave transmitting direction. By improving locality of the wave by the three-dimensional synthetic aperture processing, the position estimation accuracy of the dielectric boundary surface can be further improved.

Also, according to the first embodiment, the pre-processing unit 300 removes a DC component in a range direction and a DC component in an azimuth direction from the wave data obtained by observing the dielectric by the radar device, and corrects attenuation of the wave when passing through the dielectric. It is possible to further improve the position estimation accuracy of the dielectric boundary surface by removing the DC component of the wave data and correcting contrast.

Note that, in the present invention, any component of the embodiment may be modified, or any component of the embodiment may be omitted without departing from the scope of the invention.

For example, in the configuration example in FIG. 1, the dielectric boundary surface estimation device 100 is provided with the wave data storing unit 200 and the output data storing unit 600, but the wave data storing unit 200 and the output data storing unit 600 are not necessarily required. That is, the dielectric boundary surface estimation device 100 may have any configuration as long as it can receive wave data from the outside, calculate the widths and the thickness of a dielectric boundary surface, and output the calculation result to the outside.

INDUSTRIAL APPLICABILITY

The dielectric boundary surface estimation device according to the present invention calculates the widths and the thickness of a dielectric boundary surface using the wave data subjected to the three-dimensional synthetic aperture processing, so that it is suitable for a dielectric boundary surface estimation device used for detecting cancer, diagnosing material deterioration of a construction and the like.

REFERENCE SIGNS LIST

11: Storage device for input, 12: Processor, 13: Memory, 14: Storage device for output, 20: Observation system, 21 to 24: Transceiver, 25 to 28: Radio wave, 30 to 32: Space, 33, 34: Dielectric boundary surface, 40, 50: Wave data, 41: High-dielectric constant side boundary, 42: Low-dielectric constant side boundary, 51: High-dielectric constant side boundary point trajectory, 52: Low-dielectric constant side boundary point trajectory, 51A to 51G, 52A to 52D: Wave data per aperture, 100: Dielectric boundary surface estimation device, 200: Wave data storing unit, 300: Pre-processing unit, 400: Three-dimensional synthetic aperture processing unit, 500: Dielectric boundary surface estimating unit, 600: Output data storing unit.

The invention claimed is:

1. A dielectric boundary surface estimation device comprising:
    a pre-processor pre-processing wave data obtained by observing a dielectric by a radar device;
    a three-dimensional synthetic aperture processor performing three-dimensional synthetic aperture processing on the wave data pre-processed by the pre-processor; and
    a dielectric boundary surface estimator estimating a boundary surface between areas having different dielectric constants to each other using the wave data on which the three-dimensional synthetic aperture processing is performed by the three-dimensional synthetic aperture processor and calculating a width and a thickness of the boundary surface,
    wherein the dielectric boundary surface estimator performs division of the wave data on which the three-dimensional synthetic aperture processor performs the three-dimensional synthetic aperture processing in an azimuth direction and an elevation direction, performs three-dimensional inverse Fourier transform on the wave data after the division, extracts a trajectory of low-dielectric constant side boundary points corresponding to a low-dielectric constant side boundary surface and a trajectory of high-dielectric constant side boundary points corresponding to a high-dielectric constant side boundary surface out of the wave data after the division subjected to the three-dimensional inverse Fourier transform, calculates a width of the high-dielectric constant side boundary surface or a width of the low-dielectric constant side boundary surface from the trajectory of the high-dielectric constant side boundary points or the trajectory of the low-dielectric constant side boundary points, and calculates a thickness from the high-dielectric constant side boundary surface to the low-dielectric constant side boundary surface on a basis of a distance between a center of the trajectory of the high-dielectric constant side boundary points and a center of the trajectory of the low-dielectric constant side boundary points.

2. The dielectric boundary surface estimation device according to claim 1,
   wherein the three-dimensional synthetic aperture processor performs three-dimensional Fourier transform on the wave data pre-processed by the pre-processor, performs azimuth bulk compression to make a wave surface uniform on the wave data subjected to the three-dimensional Fourier transform, and thereafter performs interpolation to orthogonalize a wave transmitting direction.

3. The dielectric boundary surface estimation device according to claim 1,
   wherein the pre-processor removes a DC component in a range direction and a DC component in an azimuth direction from the wave data obtained by observing the dielectric by the radar device, and corrects attenuation of the wave when passing through the dielectric.

* * * * *